(12) United States Patent
Miyashita (10) Patent No.: US 9,378,430 B2
(45) Date of Patent: Jun. 28, 2016

(54) IMAGE PROCESSING DEVICE, IMAGE PROCESSING METHOD, AND NON-TRANSITORY COMPUTER-READABLE MEDIUM FOR EXTRACTING NOTE IMAGE

(71) Applicant: FUJI XEROX CO., LTD, Minato-ku, Tokyo (JP)

(72) Inventor: Harunobu Miyashita, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/280,792

(22) Filed: May 19, 2014

(65) Prior Publication Data

US 2015/0098647 A1  Apr. 9, 2015

(30) Foreign Application Priority Data

Oct. 9, 2013 (JP) ................. 2013-211809

(51) Int. Cl.
*G06K 9/34* (2006.01)
*G06K 9/46* (2006.01)

(52) U.S. Cl.
CPC .............. *G06K 9/4652* (2013.01); *G06K 9/342* (2013.01)

(58) Field of Classification Search
None
See application file for complete search history.

(56) References Cited

U.S. PATENT DOCUMENTS 4,967,381 A * 10/1990 Lane et al. ...................... 702/81
8,891,862 B1 * 11/2014 Wolk et al. ................... 382/165

FOREIGN PATENT DOCUMENTS

JP          2001-014303 A       1/2001

* cited by examiner

*Primary Examiner* — Feng Niu
(74) *Attorney, Agent, or Firm* — Sughrue Mion, PLLC (57) ABSTRACT

An image processing device includes a color extractor, an area cutout unit, a receiver, and a sticky image cutout unit. The color extractor extracts, from image information that includes multiple sticky notes, pixels of a color used for the sticky notes. The area cutout unit cuts out an area that is a set of pixels extracted by the color extractor. The receiver receives input of a dividing line with respect to an area to be cut out by the area cutout unit. The sticky image cutout unit splits an area cut out by the area extractor along a dividing line received by the receiver, and cuts out an area having a surface area within a predetermined range from among the split area as a sticky image.

5 Claims, 8 Drawing Sheets

PINK: THRESHOLD VALUE 2p

FIG. 4B

YELLOW: THRESHOLD VALUE 1y

FIG. 4C

BLUE: THRESHOLD VALUE 3b

IMAGE PROCESSING DEVICE, IMAGE PROCESSING METHOD, AND NON-TRANSITORY COMPUTER-READABLE MEDIUM FOR EXTRACTING NOTE IMAGE

CROSS-REFERENCE TO RELATED APPLICATIONS

This application is based on and claims priority under 35 USC 119 from Japanese Patent Application No. 2013-211809 filed Oct. 9, 2013.

BACKGROUND

Technical Field

The present invention relates to an image processing device, an image processing method, and a non-transitory computer-readable medium.

SUMMARY

According to an aspect of the invention, there is provided an image processing device includes a color extractor, an area cutout unit, a receiver, and a sticky image cutout unit. The color extractor extracts, from image information that includes multiple sticky notes, pixels of a color used for the sticky notes. The area cutout unit cuts out an area that is a set of pixels extracted by the color extractor. The receiver receives input of a dividing line with respect to an area to be cut out by the area cutout unit. The sticky image cutout unit splits an area cut out by the area cutout unit along a dividing line received by the receiver, and cuts out an area having a surface area within a predetermined range from among the split area as a sticky image.

BRIEF DESCRIPTION OF THE DRAWINGS

Exemplary embodiments of the present invention will be described in detail based on the following figures, wherein.

DETAILED DESCRIPTION

[Exemplary Embodiment]
(Configuration of Image Processing Device)

Figure 1:
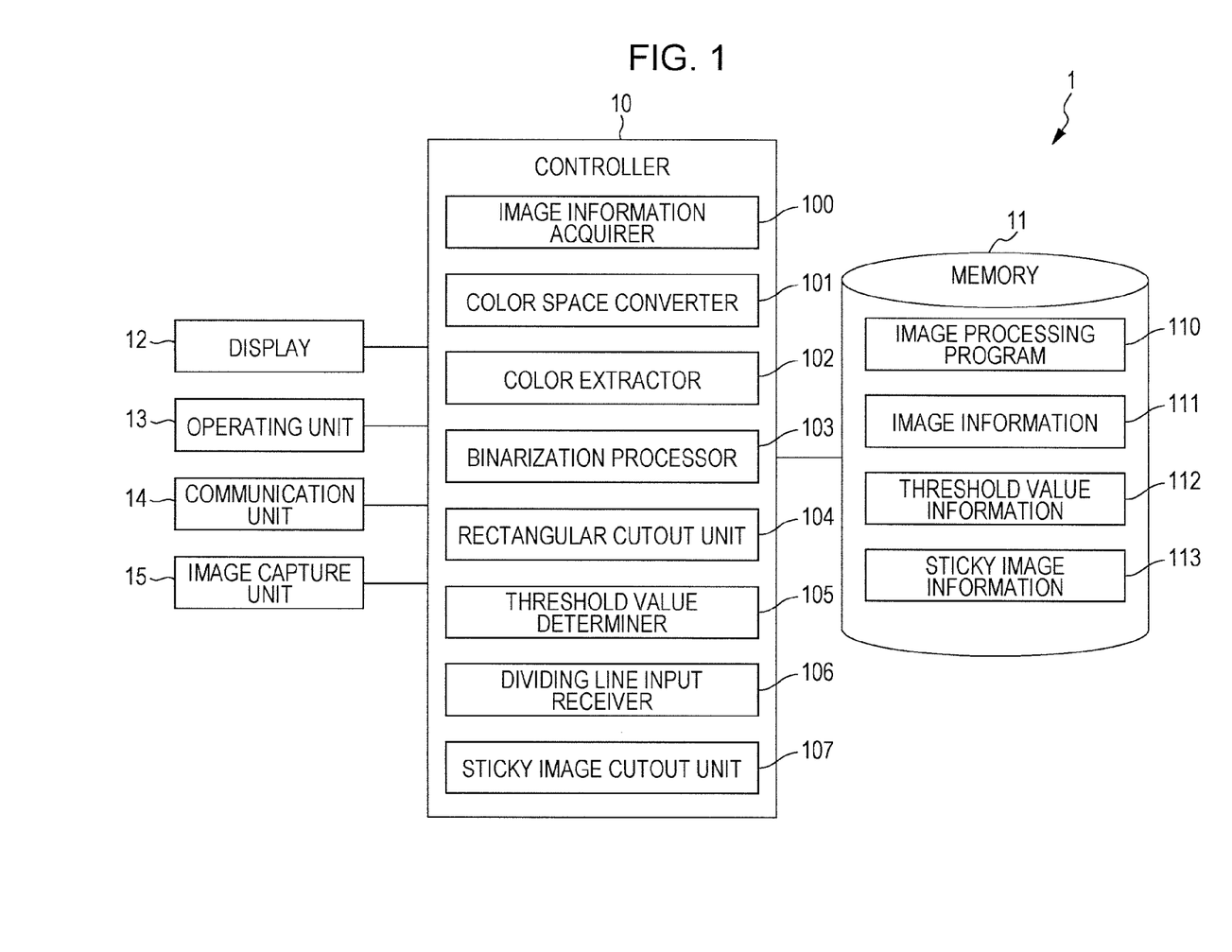
FIG. 1 is a schematic diagram illustrating an example of a configuration of an image processing device according to an exemplary embodiment.

FIG. 1 is a schematic diagram illustrating an example of a configuration of an image processing device according to an exemplary embodiment.

As an example, the image processing device 1 is an image processing device such as a mobile phone or a tablet personal computer (PC), and is equipped with: a controller 10, made up of a central processing unit (CPU) or the like, that controls respective components and also executes various programs; memory 11, made up of a memory medium such as flash memory, that stores information; a display 12 that displays text, images, and the like; an operation unit 13, which is a transparent touch sensor overlaid onto the display 12 to enable a user to operate the image processing device 1; a communication unit 14 that communicates with external equipment via a network; and an image capture unit 15, made up of a lens and a CCD or the like, that generates image information by capturing an image. By executing an image processing program 110 discussed later, the controller 10 functions as an image information acquirer 100, a color space converter 101, a color extractor 102, a binarization processor 103, a rectangular cutout unit 104, a threshold value determiner 105, a dividing line input receiver 106, a sticky image cutout unit 107, and the like.

The image information acquirer 100 acquires, from the memory 11, image information 111 depicting a pasting surface onto which multiple sticky notes have been pasted. Note that the image information 111 may be captured by the image capture unit 15, or acquired externally via the communication unit 14.

The color space converter 101 converts the color space of the image information 111. For example, in the case of RGB, the color space converter 101 converts the color space to HSV. Note that the color space is not limited to HSV, and the color space converter 101 may convert image information 111 to another color space, or use RGB without conversion, insofar as the color extraction described hereinafter may be conducted favorably.

The color extractor 102 extracts pixels satisfying a threshold value for each of predetermined colors (pink, yellow, and blue) from the color-converted image information 111. Note that multiple threshold values are configured in advance in threshold value information 112, and the color extractor 102 extracts pixels for each of the multiple threshold values.

The binarization processor 103 conducts binarization by treating the pixels extracted by the color extractor 102 as "1" (white), and all other pixels as "0" (black), for each of the predetermined colors (pink, yellow, and blue).

The rectangular cutout unit 104 is an example of an area cutout unit, and for each of the predetermined colors (pink, yellow, and blue), cuts out an area, which is a set of pixels treated as "1" (white) by the binarization processor 103. As an example, the shape of the cutout area is a rectangle. However, the cutout area is not limited to a rectangle, and a polygonal area, an area made up of curves, or an arbitrary enclosed area may also be cut out. In addition, the shapes of stickies 2a, 2b, 2c, and so on may be registered in advance, and cut out to areas with the registered shapes.

The threshold value determiner 105 counts the number of rectangular areas cut out by the rectangular cutout unit 104 for each of the predetermined colors (pink, yellow, and blue), and decides on the threshold value with the highest number of rectangular areas as the threshold value to adopt.

The dividing line input receiver 106 presents, to a user via the display 12, areas cut out by the rectangular cutout unit 104 according to the threshold value decided by the threshold value determiner 105, prompts the user to input a dividing line at a desired position at which to split an area if desired, and receives an operation of inputting a dividing line that is performed on the operation unit 13 by the user.

The sticky image cutout unit 107 cuts out, from the image information 111, images of rectangular areas cut out by the decided threshold value as sticky image information 113, for each of the predetermined colors (pink, yellow, and blue). Note that in the case of the dividing line input receiver 106 receiving dividing line input, the sticky image cutout unit 107 splits an area cut out by the rectangular cutout unit 104 on the basis of that dividing line, and cuts out images of the areas generated as a result of the split from the image information 111 as sticky image information 113.

The memory 11 stores information such as the image processing program 110 that causes the controller 10 to operate as the respective units 101 to 107 discussed above, the image information 111, the threshold value information 112, and the sticky image information 113.

Note that the image processing device 1 may also omit the image capture unit 15 in the case of acquiring the image information 111 externally via the communication unit 14. Furthermore, the image processing device 1 may also omit the display 12 and the operation unit 13, and be a server device that operates by receiving a request from an external client via the communication unit 14.

(Operation of Image Processing Device)

Next, action according to the present exemplary embodiment will be separately described as (1) basic operation, (2) threshold value determination operation, (3) dividing line input receiving operation, and (4) sticky cutout operation.

(1) Basic Operation

Figure 2:
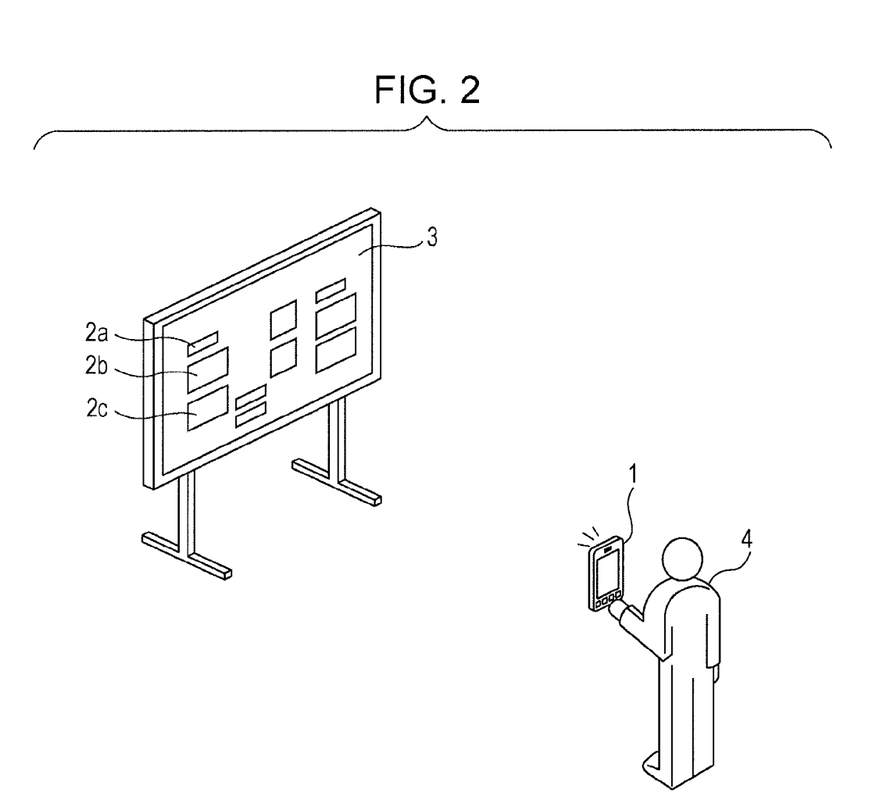
FIG. 2 is a schematic diagram for illustrating basic operation of an image processing device.

FIG. 2 is a schematic diagram for illustrating basic operation of the image processing device 1.

As illustrated in FIG. 2, first, for the purpose of brainstorming, for example, a user 4 writes stickies 2a, 2b, 2c, and so on, and pastes the stickies 2a, 2b, 2c, and so on onto a writing surface of a white board 3 that acts as a pasting surface. The stickies 2a, 2b, 2c and so on, although conceivably having various shapes, will be hereinafter described as being rectangular for the sake of description. Also, various sizes of the stickies 2a, 2b, 2c, and so on may be available.

Next, after finishing brainstorming, the user 4 uses the image capture unit 15 of the image processing device 1 to capture an image of the writing surface of the whiteboard 3 with the pasted stickies 2a, 2b, 2c, and so on.

After image capturing is executed by the image capture unit 15, the image processing device 1 stores the captured image in the memory 11 as image information 111.

Since the stickies 2a, 2b, 2c, and so on pasted onto the whiteboard 3 will be used at a later date, the user 4 requests the image processing device 1 to digitize the stickies 2a, 2b, 2c, and so on. In other words, the user 4 makes a request to respectively cut out images of the stickies 2a, 2b, 2c, and so on captured in the image information 111, and handle the cutout images as sticky image information 113.

Operation of the image processing device 1 in the case of receiving the above request will be described below.

(2) Threshold Value Determination Operation

Figure 8:
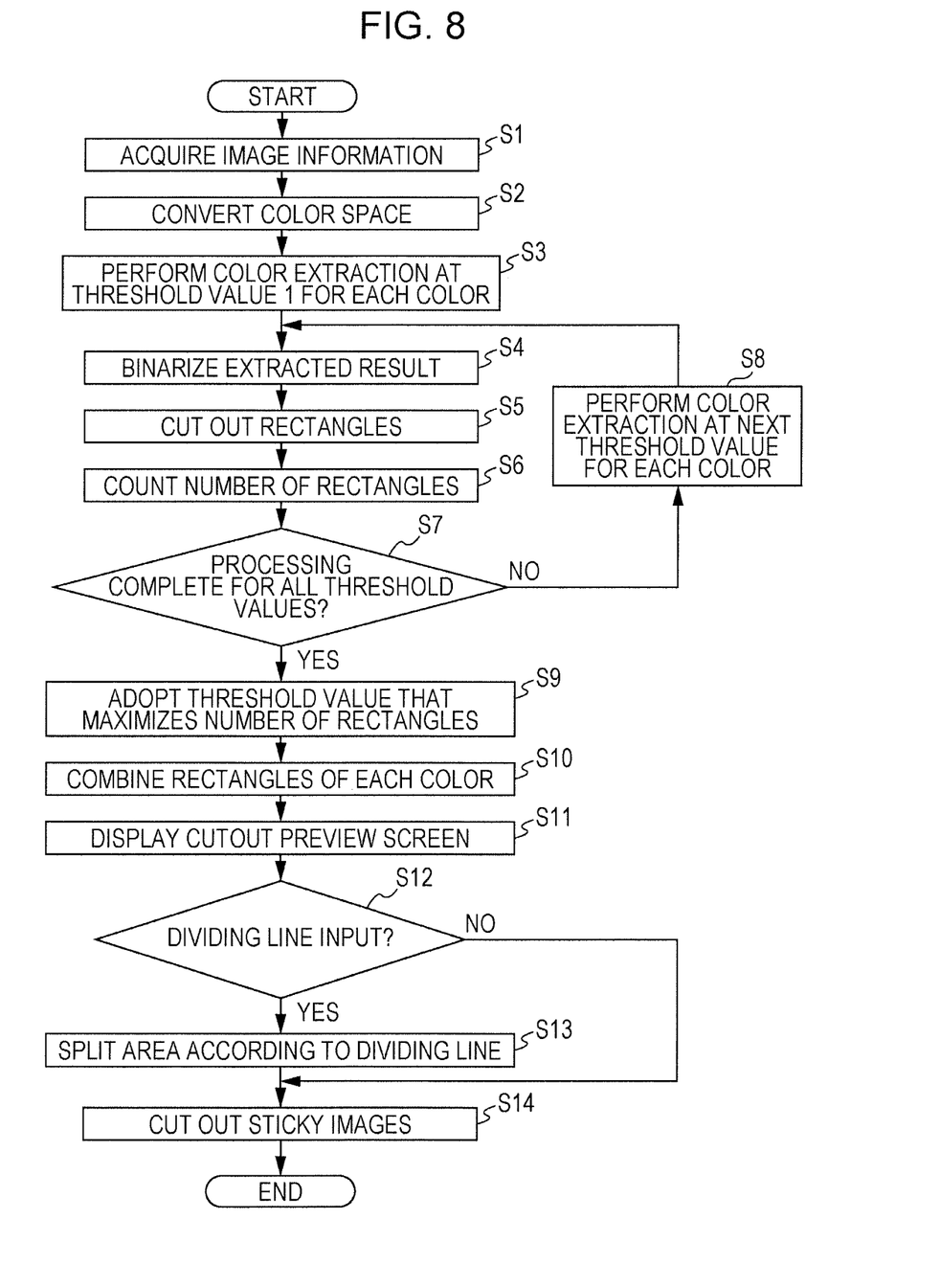
FIG. 8 is a flowchart illustrating exemplary operation of an image processing device.

FIG. 8 is a flowchart illustrating exemplary operation of the image processing device 1. Also, FIGS. 3A to 3E are schematic diagrams for illustrating threshold determination operation of the image processing device 1.

Figure 3A:
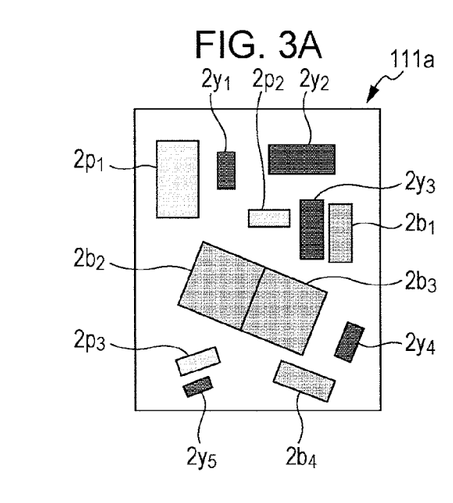
FIGS. 3A to 3E are schematic diagrams for illustrating threshold value determination operation of an image processing device.

First, as illustrated in FIG. 3A, the image information acquirer 100 acquires, from the memory 11, image information 111a as an example of the image information 111 (S1). Assume that the image information 111a depicts pink stickies $2p_1$, $2p_2$, and $2p_3$, yellow stickies $2y_1$, $2y_2$, $2y_3$, $2y_4$, and $2y_5$, and blue stickies $2b_1$, $2b_2$, $2b_3$, and $2b_4$.

Next, in the case in which the color space of the image information 111a is RGB, the color space converter 101 converts the color space to HSV (S2).

Next, the color extractor 102 extracts pixels satisfying a threshold value for each of predetermined colors (pink, yellow, and blue) from the color-converted image information 111. First, pixels are extracted according to a first threshold value $1p$ from among the multiple threshold values preconfigured in the threshold value information 112 (S3). Hereinafter, for the sake of simplicity, the case of extracting pink will be discussed.

Figure 3B:
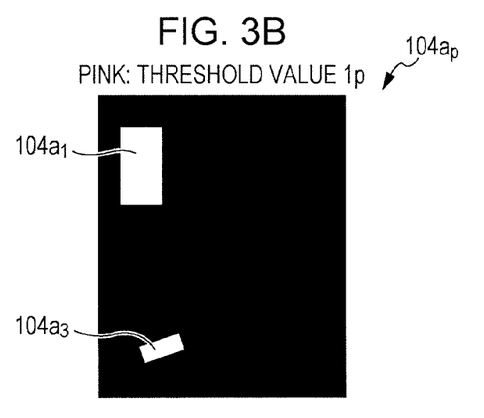
Figure 3C:
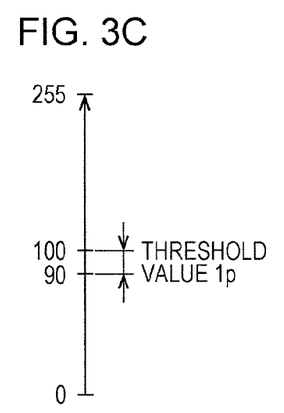

Assume that the threshold value $1p$ is configured to have a threshold value range from 90 to 100, as illustrated in FIG. 3C. Note that in the case of the HSV space, when the hue (H), saturation (S), and brightness value (V) parameters have a minimum value of 0 and a maximum value of 255, the threshold value $1p$ has a range for each of H, S, and V. However, in the example of FIG. 3C, only the threshold value for the H parameter is illustrated for the sake of simplicity.

Next, as illustrated in FIG. 3B, the binarization processor 103 conducts binarization by treating the pixels that were extracted by the color extractor 102 for pink by being included in the threshold value $1p$ as "1" (white), and all other pixels as "0" (black) (S4).

Next, as illustrated FIG. 3B, the rectangular cutout unit 104 cuts out the areas of images treated as "1" (white) by the binarization processor 103 for pink to (for example) rectangular areas $104a_1$ and $104a_3$ (rectangular areas 104a) (S5).

Next, the threshold value determiner 105 counts "2" as the number of rectangular areas cut out by the rectangular cutout unit 104 according to the threshold value $1p$ for pink (S6).

Next, the color extractor 102 extracts pixels from the image information 111 according to the pink threshold value $2p$ (S8). Assume that the threshold value $2p$ is configured to have a threshold value range from 95 to 105, as illustrated in FIG. 3E.

Figure 3D:
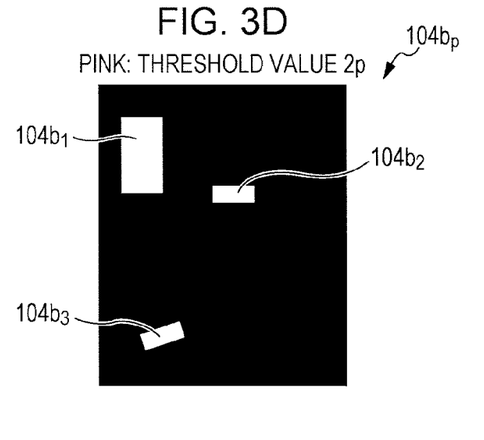
Figure 3E:
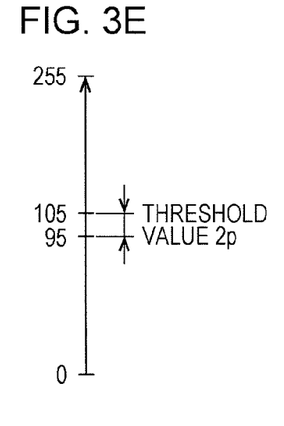

Next, as illustrated in FIG. 3D, the binarization processor 103 conducts binarization by treating the pixels that were extracted by the color extractor 102 for pink by being included in the threshold value $2p$ as "1" (white), and all other pixels as "0" (black) (S4).

Next, as illustrated FIG. 3D, the rectangular cutout unit 104 cuts out the areas of images treated as "1" (white) by the binarization processor 103 for pink to (for example) rectangular areas $104b_1$ to $104b_3$ (rectangular areas 104b) (S5).

Next, the threshold value determiner 105 counts "3" as the number of rectangular areas cut out by the rectangular cutout unit 104 according to the threshold value $2p$ for pink (S6).

The above steps S3 to S8 are repeated for two or more threshold values, and the threshold value determiner 105 adopts the threshold value yielding the most rectangular shapes (S9). Assume that for pink, the threshold value $2p$ yielding the maximum of three rectangular shapes is adopted.

The above threshold value decision is executed for the respective colors other than pink (yellow and blue). The following operation will be described under the assumption that a threshold value $1y$ is adopted for yellow, and a threshold value $3b$ is adopted for blue.

FIGS. 4A to 4D are schematic diagrams for illustrating operation of the image processing device 1.

Figure 4A:
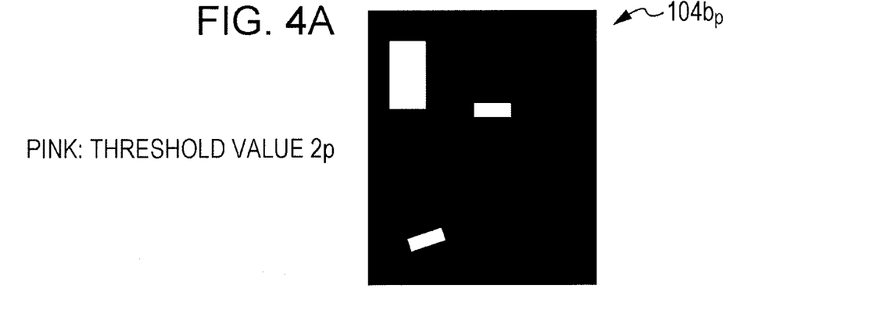
FIGS. 4A to 4D are schematic diagrams for illustrating operation of an image processing device.
Figure 4B:
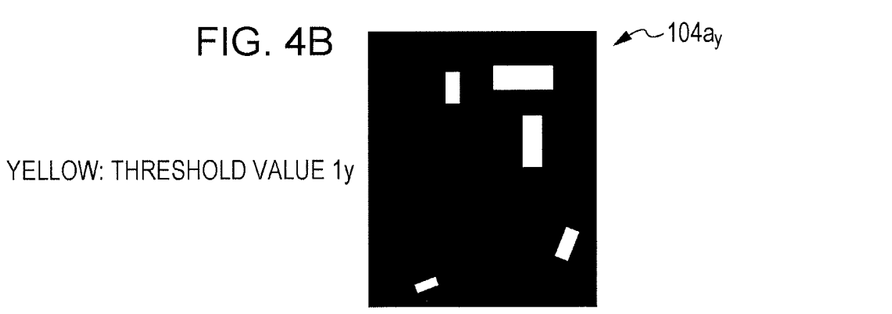
Figure 4C:
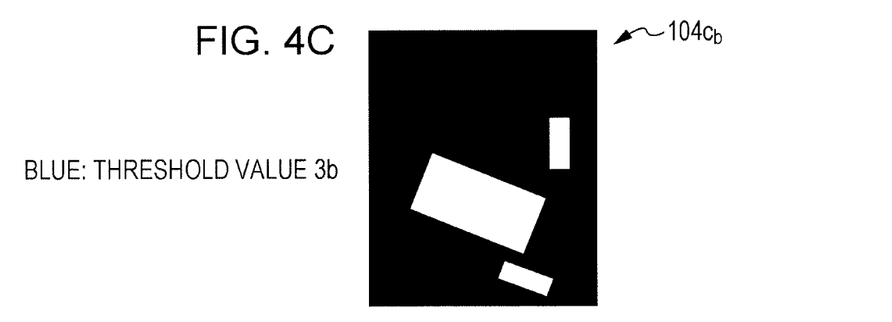
Figure 4D:
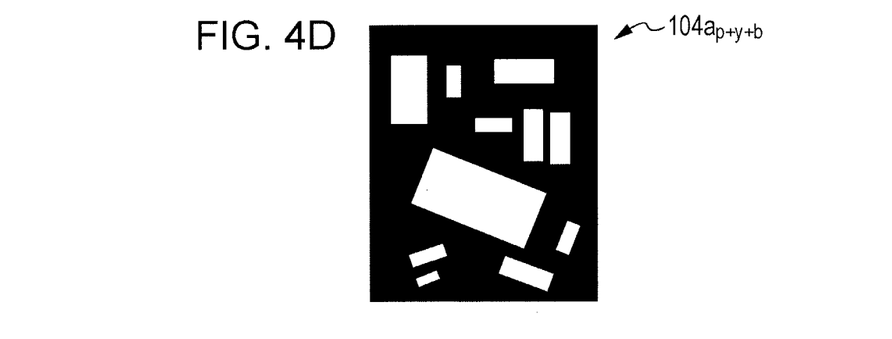

The rectangular cutout unit 104 combines the rectangular areas $104b_p$, $104a_y$, and $104c_p$ cut out for each color (pink, yellow, and blue) illustrated in FIGS. 4A to 4C, and makes a rectangular area $104a_{p+y+b}$ as illustrated in FIG. 4D (S10). Note that in this state, since the blue stickies $2b_2$ and $2b_3$ were pasted adjacently, the respective rectangles are not recognized and instead treated as a single rectangle.

(3) Dividing Line Input Receiving Operation

Figure 5A:
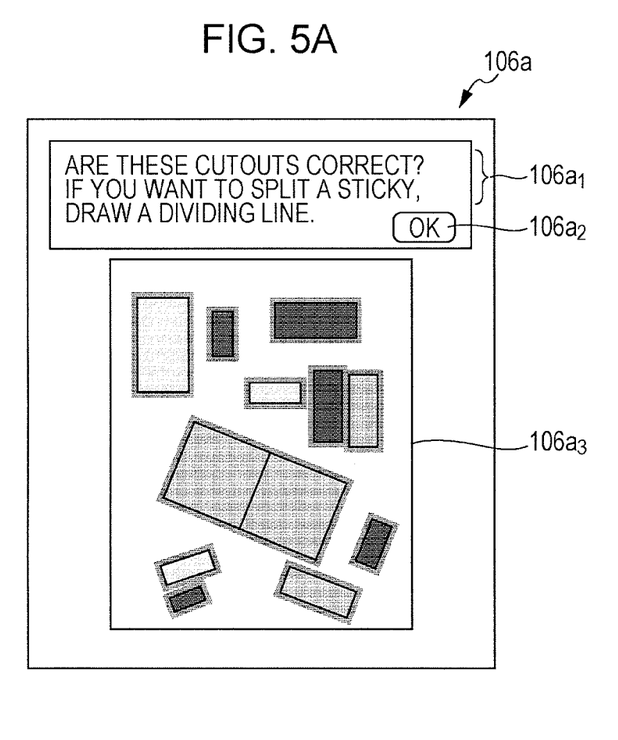
FIGS. 5A and 5B are schematic diagrams illustrating an example of a configuration of a screen displayed on a display by a dividing line input receiver.
Figure 5B:
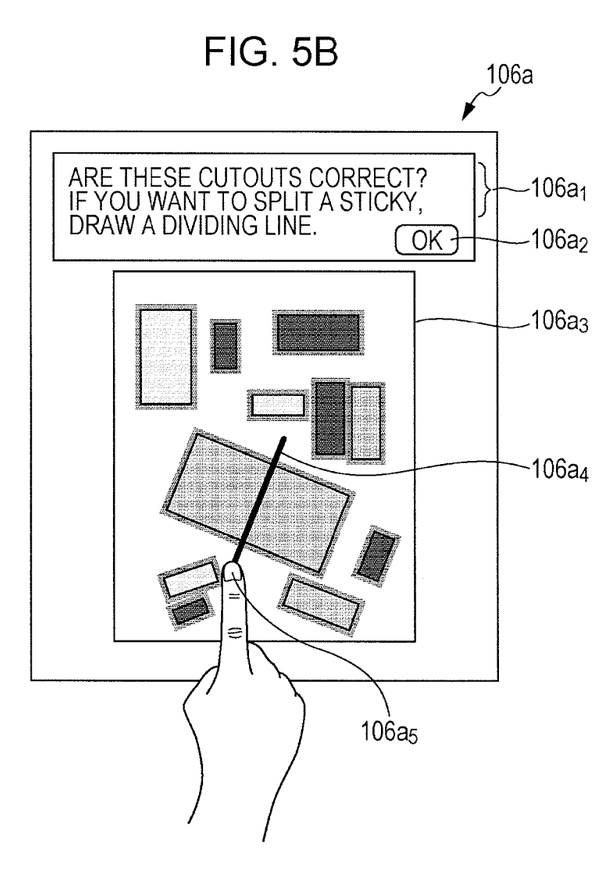

FIGS. 5A and 5B are schematic diagrams illustrating an example of a configuration of a screen displayed on the display 12 by the dividing line input receiver 106.

Next, as illustrated in FIG. 5A, the dividing line input receiver 106 displays on the display 12 a cutout preview screen 106a that includes a cutout preview $106a_3$ combining the rectangular area $104a_{p+y+b}$ cut out by the rectangular cutout unit 104, and the image information 111a (S11). The cutout preview screen 106a also includes: a message $106a_1$ prompting the user to confirm whether or not the rectangular areas to additionally cut out are correct, and if a rectangular area is incorrect, to input a dividing line at a desired position to split that area; and an OK button $106a_2$ operated when user operations are complete.

Note that the cutout preview screen 106a is not limited to presenting a combined display of the rectangular area $104a_{p+y+b}$ and the image information 111a, and may also display the image information 111a and receive input of a dividing line at the beginning of the operation according to the present exemplary embodiment.

Next, as illustrated in FIG. 5B, the user inputs a dividing line into the operation unit 13 with a fingertip $106a_5$.

In the case in which a dividing line is input (S12; Yes), the dividing line input receiver 106 of the image processing device 1 receives the operation, and splits a rectangular area at the position corresponding to the dividing line $106a_4$ (S13).

(4) Sticky Cutout Operation

Figure 6A:
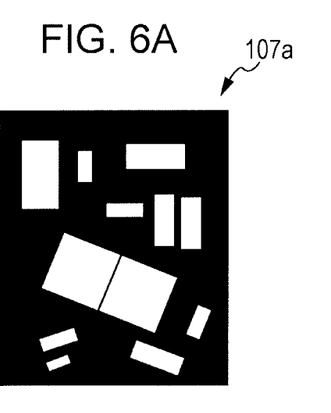
FIGS. 6A and 6B are schematic diagrams for illustrating sticky cutout operation.
Figure 6B:
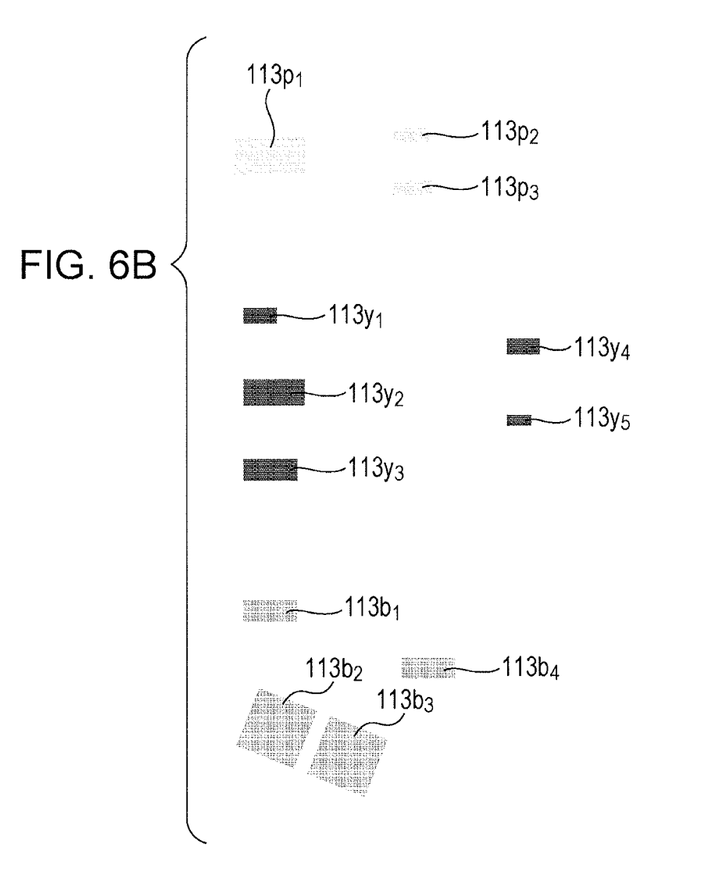

FIGS. 6A and 6B are schematic diagrams for illustrating sticky cutout operation.

Next, the sticky image cutout unit 107 splits the area of a rectangle in the rectangular area $104a_{p+y+b}$ along the dividing line to make a rectangular area 107a as illustrated in FIG. 6A, and cuts out pink sticky image information $113p_1$ to $113p_3$, yellow sticky image information $113y_1$ to $113y_5$, and blue sticky image information $113b_1$ to $113b_4$ from the image information 111a according to this rectangular area 107a, as illustrated in FIG. 6B (S14).

(Other Examples of Dividing Line Input and Sticky Cutout Operation)

FIGS. 7A to 7J are schematic diagrams for illustrating other examples of dividing line input and sticky cutout operation.

Figure 7A:
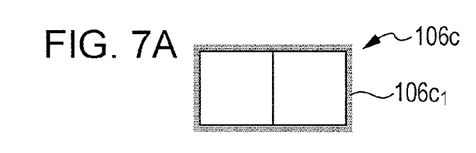
FIGS. 7A to 7J are schematic diagrams for illustrating other examples of dividing line input and sticky cutout operation.
Figure 7B:
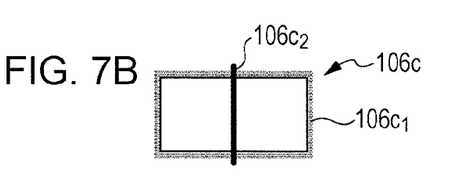

In the example illustrated in FIG. 7A, there are two stickies 106c lined up next to each other without a gap, and the rectangular cutout unit 104 has cut out these stickies 106c as a rectangular area $106c_1$. For this reason, as illustrated in FIG. 7B, the user inputs a dividing line $106c_2$ along the boundary between the two stickies 106c. The rectangular area $106c_1$ is split into two down the middle by the sticky image cutout unit 107.

Figure 7C:
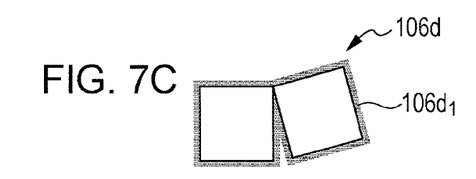
Figure 7D:
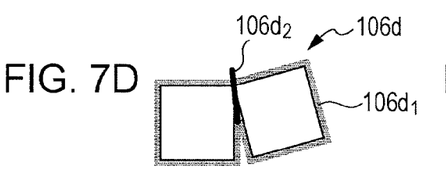
Figure 7E:
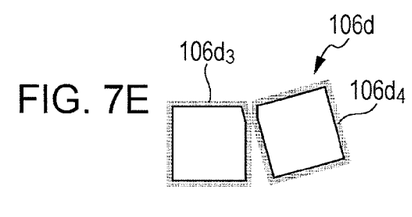

Also, in the example illustrated in FIG. 7C, there are two stickies 106d arranged with vertices touching, and the rectangular cutout unit 104 has cut out these stickies 106d as a area $106d_1$ shaped as though a notch has been cut into the bottom of a rectangle. For this reason, as illustrated in FIG. 7D, the user inputs a dividing line $106d_2$ along the portion where the vertices of the two stickies 106d touch. According to the dividing line $106d_2$, the area $106d_1$ is split by the sticky image cutout unit 107 into an area $106d_3$ and an area $106d_4$, as illustrated in FIG. 7E. Although the area $106d_3$ and the area $106d_4$ are pentagons rather than rectangles, assume that the sticky image cutout unit 107 is not limited to a particular sticky shape, and recognizes arbitrary polygonal shapes as areas.

Figure 7F:
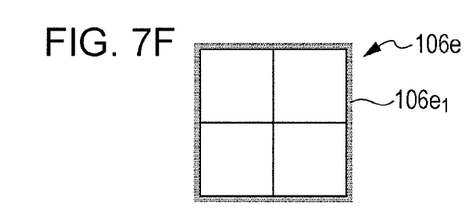
Figure 7G:
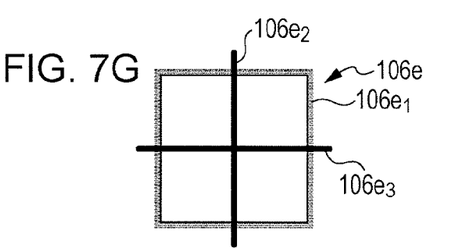

Also, in the example illustrated in FIG. 7F, there are four stickies 106e lined up in a 2×2 grid without gaps, and the rectangular cutout unit 104 has cut out these stickies 106e as a rectangular area $106e_1$ that is double the horizontal and vertical size of a sticky. For this reason, as illustrated in FIG. 7G, the user inputs dividing lines $106e_2$ and $106e_3$ along the boundaries between the four stickies 106e. According to the dividing lines $106e_2$ and $106e_3$, the area $106e_1$ is split into two vertically and two horizontally by the sticky image cutout unit 107.

Figure 7H:
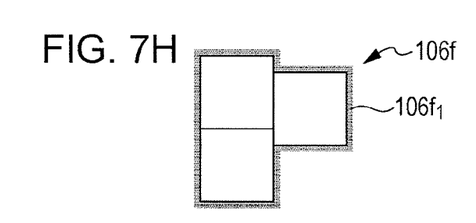
Figure 7I:
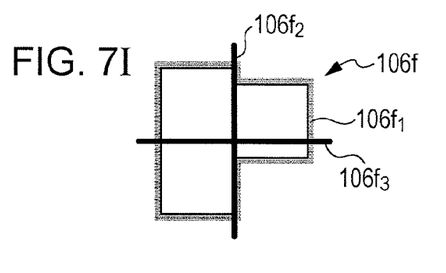
Figure 7J:
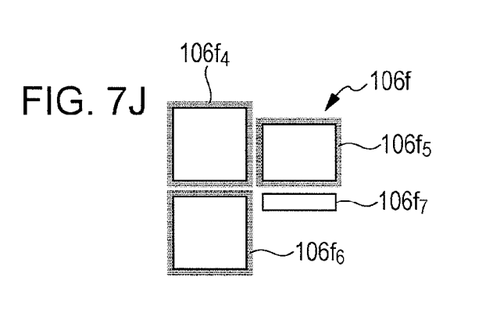

Also, in the example illustrated in FIG. 7H, there are a total of three stickies 106f in which two stickies are arranged vertically without a gap while the other sticky touches each edge of the two stickies on one side, and the rectangular cutout unit 104 has cut out these stickies 106f as an area $106f_1$ shaped like a sideways "T". For this reason, as illustrated in FIG. 7I, the user inputs dividing lines $106f_2$ and $106f_3$ along the boundaries between the three stickies 106f. According to the dividing lines $106f_2$ and $106f_3$, the area $106f_1$ is split by the sticky image cutout unit 107 into areas $106f_4$ to $106f_7$, as illustrated in FIG. 7J. Note that the area $106f_7$ has a small surface area compared to the other areas $106f_4$ to $106f_6$, and thus is not recognized as an area for cutting out sticky image information 113.

Note that the above area $106f_7$ is made to be not recognized as an area for cutting out sticky image information 113 according to the method specifically described below. First, a histogram of the surface area of the areas $106f_4$ to $106f_7$ is created, and the results of multiplying the center value $S_{center}$ by constants $\alpha_{min}$ and $\alpha_{max}$ are taken to be a minimum value $S_{min}$ and a maximum value $S_{max}$ respectively. From among the surface areas $S_4$ to $S_7$ of the areas $106f_4$ to $106f_7$, an area that does not satisfy $S_{min} 21 S_i < S_{max}$ is made to be not recognized as an area for cutting out sticky image information 113. Also, the constants $\alpha_{min}$ and $\alpha_{max}$ are arbitrarily decidable by an administrator, with $\alpha_{min}$ taken to be less than 1.0, and $\alpha_{max}$ greater than 1.0. In addition, an area not included within a surface area range defined by a predetermined maximum value and minimum value may also not be recognized as an area for cutting out sticky image information 113.

[Other Exemplary Embodiments]

Note that the present invention is not limited to the foregoing exemplary embodiment, and that various modifications are possible within a scope that does not depart from the spirit of the present invention. For example, for each of the pink sticky image information $113p_1$ to $113p_3$, yellow sticky image information $113y_1$ to $113y_5$, and blue sticky image information $113b_1$ to $113b_4$, information such as relative position information with respect to the writing surface of the whiteboard 3 of the corresponding sticky, tilt information, and the capture time of the original image may also be recorded as metadata.

In the foregoing exemplary embodiment, the functions of the respective components 100 to 107 of the controller 10 are realized by a program, but some or all of the respective functions may also be realized by hardware such as an ASIC. Also, a program used by the foregoing exemplary embodiment may be provided by being stored on a recording medium such as a CD-ROM. Also, the above steps described in the foregoing exemplary embodiment may be reordered or deleted, or new steps may be added thereto within a range that does not change the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a display; and
at least one processor configured to implement:
a color extractor configured to extract, from image information that includes information corresponding to a plurality of notes, pixels of a color used for the notes;
an area cutout unit configured to cut out a first area that is a set of pixels extracted by the color extractor;
a receiver configured to receive input of a dividing line with respect to the first area; and
an image cutout unit configured to split the first area along the dividing line into a second area and a third area,
wherein the image cutout unit is further configured to, in response to one of the second and third areas having a surface area within a predetermined range, cut out the respective area from among the second and third areas as an image,
wherein the image cutout unit is further configured to, in response to one of the second and third areas not having a surface area within the predetermined range, refrain from cutting out the respective area from among the second and third areas as the image,
wherein the display is configured to display a cutout preview screen including the first area, and
wherein the dividing line is input at a desired position to split the first area, with respect to the displayed cutout preview screen including the first area.

2. The image processing device according to claim 1, wherein
the image cutout unit is further configured to define the predetermined range using a predetermined maximum value and minimum value.

3. The image processing device according to claim 1, wherein
the image cutout unit is further configured to determine a maximum value and a minimum value on the basis of a center value of an area distribution after the split, and define the predetermined range using the maximum value and the minimum value.

4. An image processing method comprising:
extracting, from image information that includes information corresponding to a plurality of notes, pixels of a color used for the notes;
cutting out a first area that is a set of extracted pixels;
displaying a cutout preview screen including the first area;
receiving input of a dividing line at a desired position to split the first area, with respect to the displayed cutout preview screen including the first area;
splitting the first area along the received dividing line into a second area and a third area;
cutting out, in response to one of the second and third areas having a surface area within a predetermined range, the respective area from among the second and third areas as an images; and
refraining from cutting out, in response to one of the second and third areas not having a surface area within the predetermined range, the respective area from among the second and third areas as the image.

5. A non-transitory computer readable medium storing a program causing a computer to execute a process for processing an image, the process comprising:
extracting, from image information that includes information corresponding to a plurality of notes, pixels of a color used for the notes;
cutting out a first area that is a set of extracted pixels;
displaying a cutout preview screen including the first area;
receiving input of a dividing line at a desired position to split the first area, with respect to the displayed cutout preview screen including the first area;
splitting the first area along the received dividing line into a second area and a third area;
cutting out, in response to one of the second and third areas having a surface area within a predetermined range, the respective area from among the second and third areas as an image; and
refraining from cutting out, in response to one of the second and third areas not having a surface area within the predetermined range, the respective area from among the second and third areas as the image.

* * * * *